(12) United States Patent
Shrufi et al.

(10) Patent No.: US 7,702,685 B2
(45) Date of Patent: Apr. 20, 2010

(54) QUERYING SOCIAL NETWORKS

(75) Inventors: Adel A. Shrufi, Bellevue, WA (US);
Ajitesh Kishore, Kirkland, WA (US);
Glen H. Anderson, Woodinville, WA (US); Sameer Mahajan, Bellevue, WA (US); Sunil Swami, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 237 days.

(21) Appl. No.: 11/275,651

(22) Filed: Jan. 20, 2006

(65) Prior Publication Data
US 2007/0174304 A1 Jul. 26, 2007

(51) Int. Cl.
*G06F 7/00* (2006.01)

(52) U.S. Cl. ............................... 707/760; 707/999.004

(58) Field of Classification Search ........................ None
See application file for complete search history.

(56) References Cited

U.S. PATENT DOCUMENTS

| | | | | |
|---|---|---|---|---|
| 5,963,951 A * | 10/1999 | Collins | ........................ | 707/102 |
| 6,061,681 A | 5/2000 | Collins | | |
| 6,820,204 B1 * | 11/2004 | Desai et al. | ..................... | 726/6 |
| 7,069,308 B2 | 6/2006 | Abrams | | |
| 2002/0059201 A1 * | 5/2002 | Work | ............................. | 707/3 |
| 2004/0148275 A1 | 7/2004 | Achlioptas | | |
| 2005/0283497 A1 | 12/2005 | Nurminen et al. | | |
| 2006/0004590 A1 | 1/2006 | Khoo | | |
| 2006/0122974 A1 | 6/2006 | Perisic | | |
| 2006/0161599 A1 | 7/2006 | Rosen | | |
| 2006/0173838 A1 | 8/2006 | Garg et al. | | |
| 2006/0235873 A1 | 10/2006 | Thomas | | |

FOREIGN PATENT DOCUMENTS

| WO | WO2005015470 | 2/2005 |
|---|---|---|
| WO | WO2006055555 | 5/2006 |

OTHER PUBLICATIONS

Henry Kautz, Bart Selman, Mehul Shah, The Hidden Web, Summer 1997, AI Magazine, vol. 18, pp. 27-35.*
Angela Bonifati, Stefano Ceri, Comparative analysis of five XML query languages, Mar. 2000, ACM Press, ACM SIGMOD Record vol. 29 Issue 1.*
A Deutsch, M. Fernandez, D. Florescu, Alon Levy and D. Suciu, A Query Language for XML, Proc. Of 8th Int. World Wide Web Conference, May 1999.*
Pitts, Graph—Linked Implementation, 2000, Computer Science Department at Boston University, http://www.cs.bu.edu/teaching/c/graph/linked/.*

(Continued)

*Primary Examiner*—Pierre M Vital
*Assistant Examiner*—Jason Liao

(57) ABSTRACT

A data model models a social network. The data model can be embodied as a person profile schema and a connector profile schema. The person profile schema defines properties of persons in the social network. The connector profile schema defines connectivity properties of persons that connect a searcher to the persons in social network that the searcher desires to find. Query languages can be based on the data model and can be used to express queries of social networks. Queries can be for persons, for connecting persons, or for both.

20 Claims, 10 Drawing Sheets

OTHER PUBLICATIONS

Kautz et al, Creating Models of Real-World Communities with ReferralWeb, 1998, http://www.cs.rochester.edu/~kautz/talks/rec98talk.ppt.*

Shah, ReferralWeb: A Resource Location System Guided by Personal Relations, 1997, MIT.*

Bin Yu and Munindar P. Singh; "Searching Social Networks"; Jul. 14-18, 2003, Melbourne, Australia; Copyright 2003 ACM. http://delivery.acm.org/10.1145/870000/860587/p65-yu.pdf?key1=860587&key2=2119827611&coll=GUIDE&dl=GUIDE&CFID=10058106&CFTOKEN=15871651.

Duncan J. Watts, et al, "Identity and search in social networks"; Apr. 2, 2002. http://smallworld.sociology.columbia.edu/uploads/papers/watts2002_IdentitySearch.pdf.

Henry Kautz, et al; "Referral Web: combining social networks and collaborative filtering"; Communications of the ACM; Mar. 1997/vol. 40, No. 3. http://delivery.acm.org/10.1145/250000/245123/p63-kautz.pdf?key1=245123&key2=5550927611&coll=GUIDE&dl=GUIDE&CFID=10058704&CFTOKEN=49181860.

* cited by examiner

230
```
<ProfileRequest Type="PeopleProfile" Language="en-us">
    <QueryText> Knowledge Interchange
            </QueryText>
    <Properties>
      <Property name="DisplayName" />
      <Property name="EmailAddress" />
      <Property name="Title" />
      <Property name="Department" />
    </Properties>
 </ProfileRequest>
```

232
```
<ConnectionRequest>
    <Connector >
     <Properties>
       <Property name="DisplayName" />
       <Property name="EmailAddress" />
     </Properties>
    </Connector>
    <Target >
      <QueryText> EmailAddress: bobbyk@microsoft.com
                </QueryText>
    </Target>
    <Properties>
      <Property name="Connector" />
      <Property name="SearchStrength" />
    </Properties>
    <SortByProperties>
      <SortByProperty name=" SearchStrength" direction="descending" />
    </SortByProperties>
  </ConnectionRequest>
```

FIG. 8

QUERYING SOCIAL NETWORKS

BACKGROUND

Persons and relations between them can be modeled as graphs, where nodes represent persons and connections or edges between the nodes represent relations between the persons. These graphs are sometimes called social networks. Social networks have been stored in relational databases. Various structured query languages (SQLs) and dialects thereof are used to express requests to search relational databases. However, the present inventors have observed that SQL-like query languages are not well suited to expressing the information desired to be obtained from social networks. There is a need for a data model and language to allow intuitive expression of requests to search social networks.

SUMMARY

The following summary is included only to introduce some concepts discussed in the Detailed Description below. This summary is not comprehensive and is not intended to delineate the scope of protectable subject matter, which is set forth by the claims presented at the end.

A data model models a social network. The data model can be embodied as a person profile schema and a connector profile schema. The person profile schema defines properties of persons in the social network. The connector profile schema defines connectivity properties of persons that connect a searcher to the persons in a social network that the searcher desires to find. Query languages can be based on the data model and can be used to express queries of social networks. Queries can be for persons, for connecting persons or relationships, or for both.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

FIG. 8 shows some example query requests.

DETAILED DESCRIPTION

Users who wish to search a social network often have not been able to express the information that they wish obtain from a social network. Below, social networks are explained in more detail. A model for social networks is then set forth. Schemas for the model are explained, after which processes and examples of using the data model are discussed.

Figure 1:
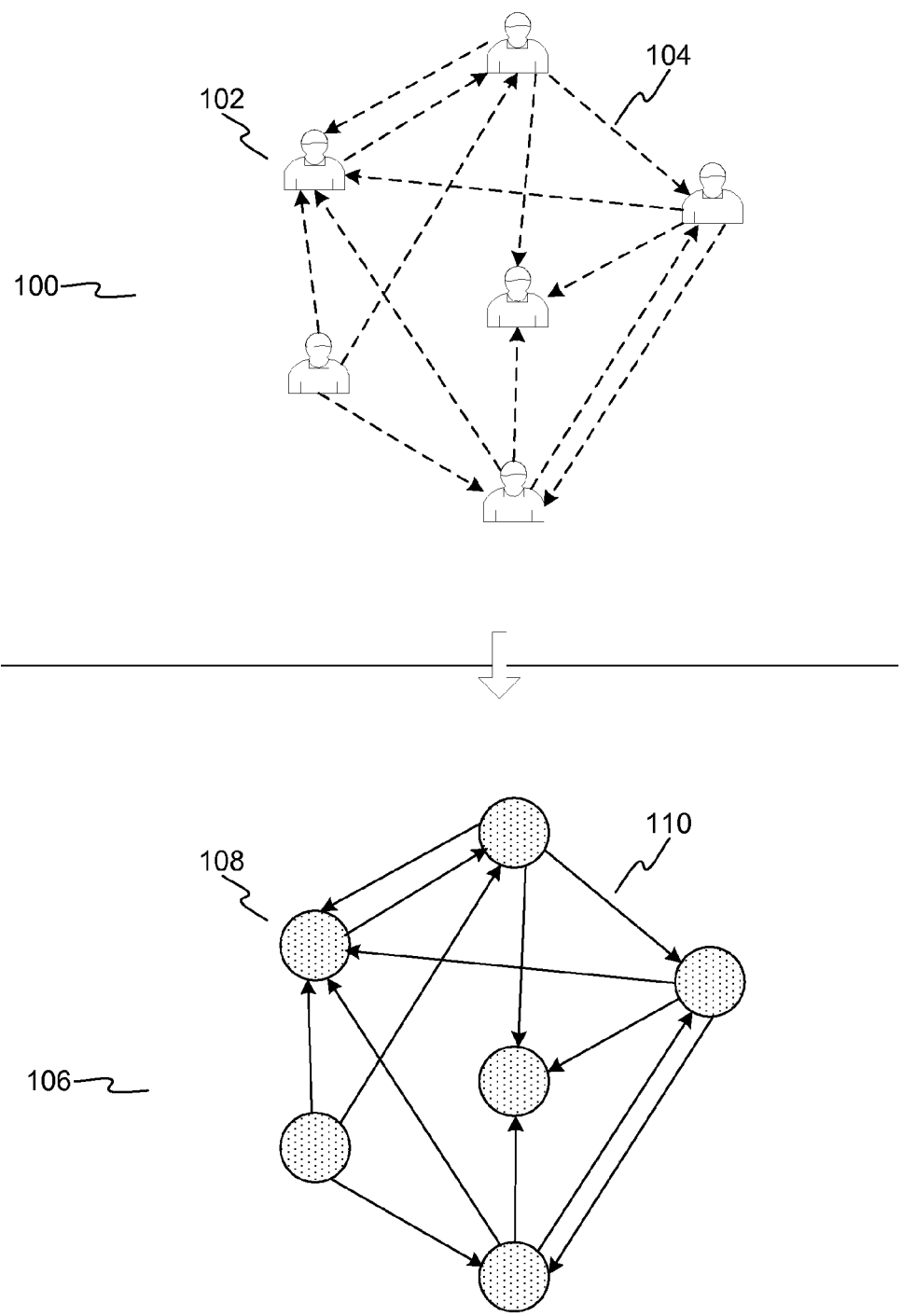
FIG. 1 shows human social network.

FIG. 1 shows human social network 100. The human social network 100 is a network of persons 102 linked by some social relationships 104. The persons 102 and relationships 104 can be of any type. For example, the persons 120 may be employees of a company and the relationships 104 might be "know" relationships (who knows who), who has communicated with who, etc. The human social network 100 can be represented by information stored on a computer, preferably as a graph. In FIG. 1, social network 106 represents the human social network 100. The social network 106 has nodes 108 that correspond to respective persons 102, and connectors 110 that correspond to the relationships 104.

The information that makes up the social network 106 can be obtained in many ways and from many types of sources. For example, a person can manually add a node representing his or her self and a set of people to which the person is related. Information about how they are related can also be added. Detail about the person can be included with the node. Information for the social network 106 can also be collected automatically from communication information such as sent email messages (sender and receiver fields can be used to build connections), documents such as news articles (semantic analysis of documents can reveal relationships between people), web pages or structured documents (people and their relations may be indicated by tags), a database storing records about people and perhaps transactions between them, and so on. A social network can also be built up from other social networks. How the information for the social network 106 is obtained is not overly important.

Figure 2:
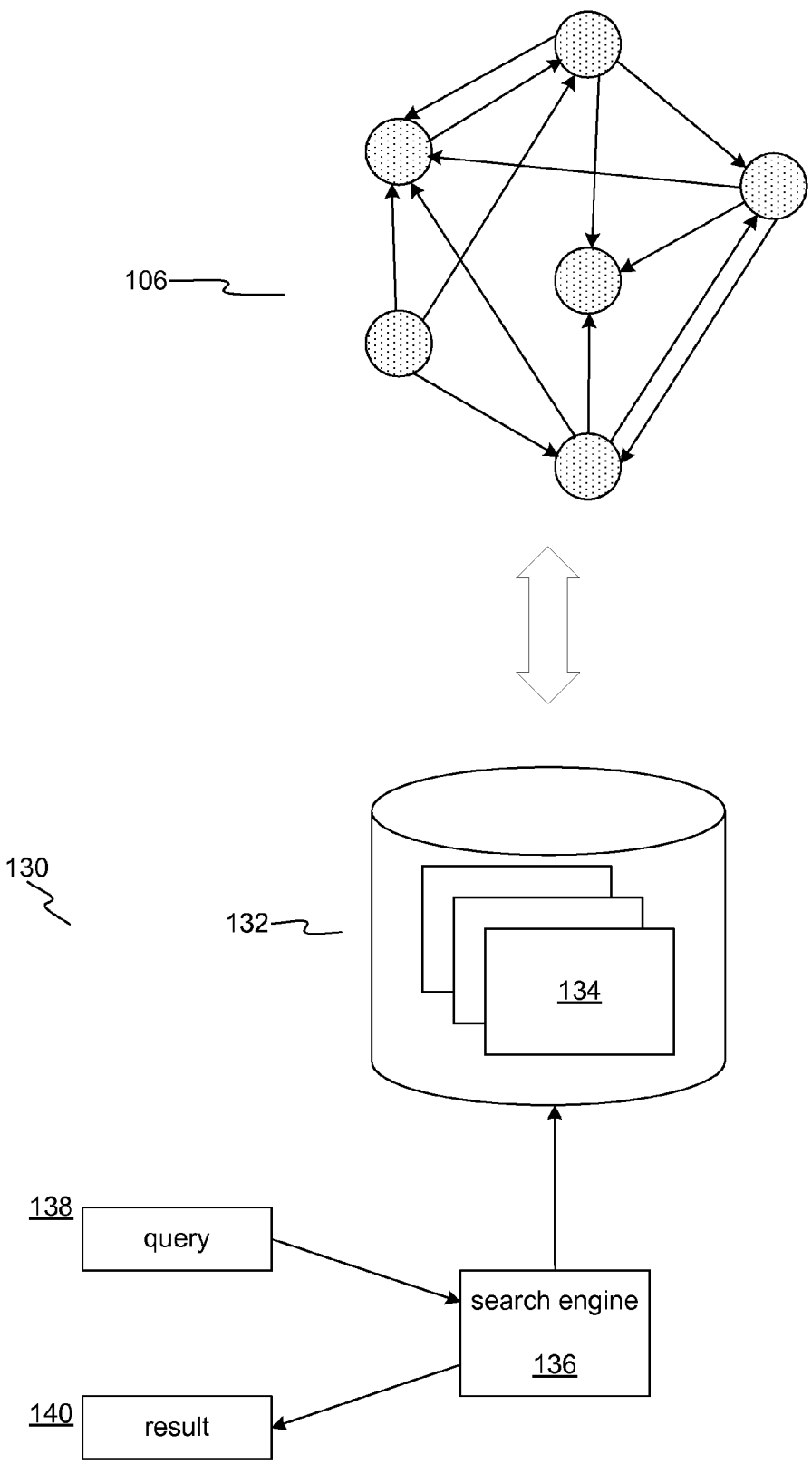
FIG. 2 shows a system for storing and searching the social network.

FIG. 2 shows a system 130 for storing and searching the social network 106. A database 132 stores the nodes and connections of the social network 106. One table 134 in the database 132 might store nodes, and another table 134 might store connections. A partial schema of the database 132 is discussed below with reference to FIG. 3. A search engine 136 receives queries 138 directed to the social network 106, searches the tables 134 for the information that satisfies the queries 136, and returns results 140. The system 130 can reside on one server computer (not shown), or it can be distributed across a network of servers that cooperate to handle search requests.

Figure 3:
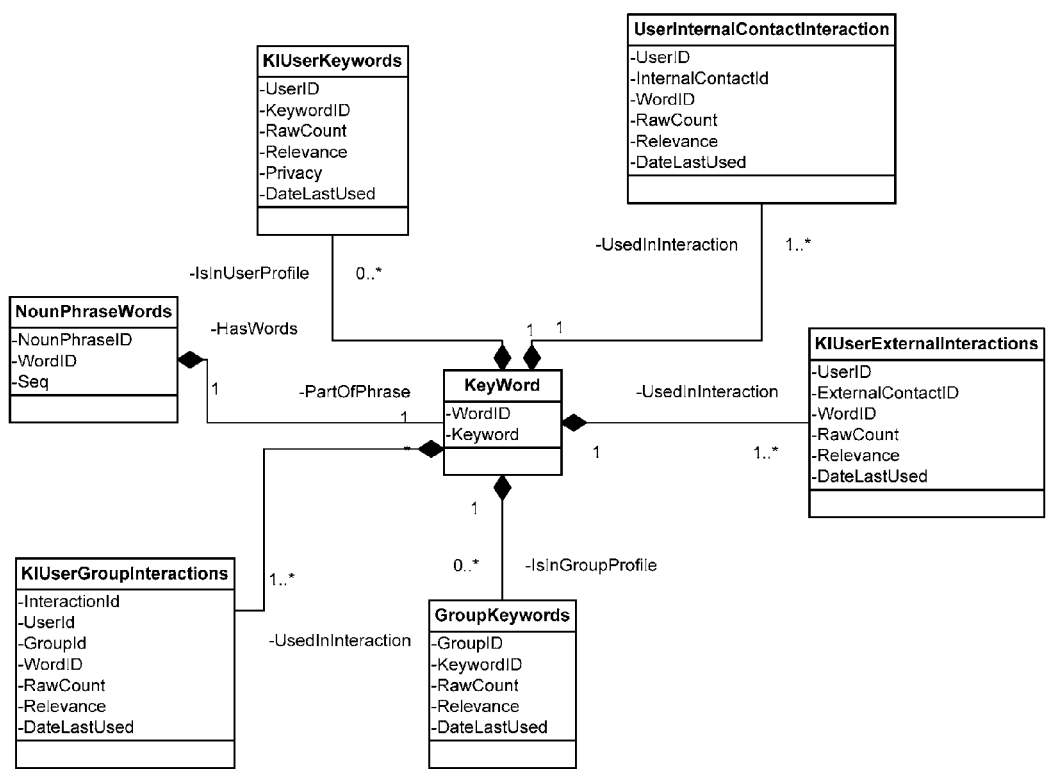
FIG. 3 shows an example of a partial schema for storing a social network.

FIG. 3 shows an example of a partial schema 150 for storing a social network. The schema 150 shown in FIG. 3 is only one example; there are many ways to structure the information that makes of a social network. The elements and relations defined by schema 150 are self explanatory. A few points of interest will be mentioned. A set of weighted searchable keywords are stored for each user. Persons or contacts can be differentiated based on whether they are internal or external to an organization.

Figure 4:
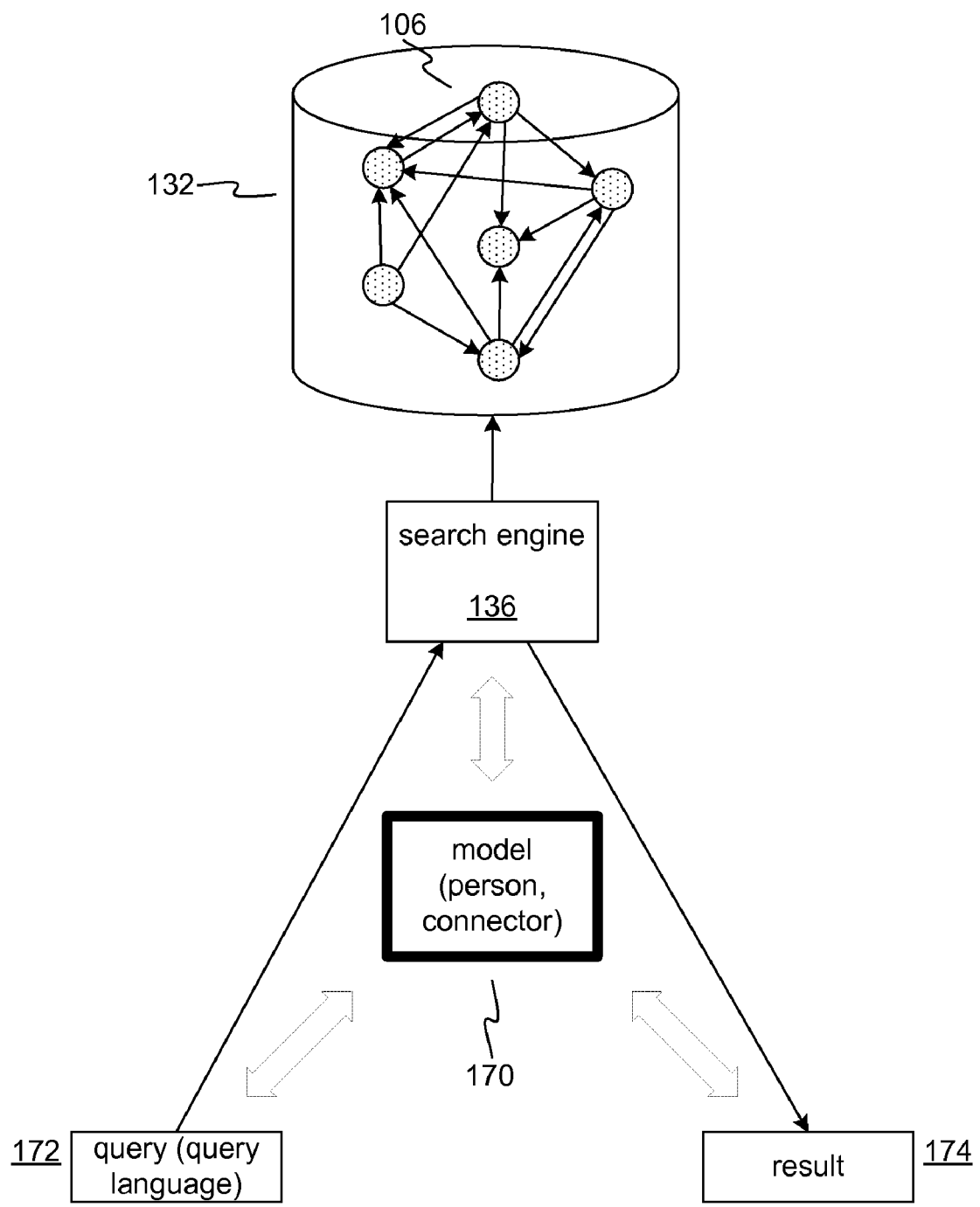
FIG. 4 shows a data model for modeling the social network stored in the storage, repository, or database.

FIG. 4 shows a data model 170 for modeling the social network 106 stored in the storage, repository, or database 132. The data model 170 functions something like a template. Queries 172 are constructed in a language that maps to the data model 170. The search engine 136 is configured with logic to perform the specified searches, which may involve mapping between the data model 170 and the underlying structure of the social network 106. In one embodiment, an approach similar to that of Sharepoint (tm) is used. A namespace is presented for crawled or searched data (the data stored in the database 132), which allows exposed properties of the social network 106 to be queried and retrieved in the query language. The namespace is roughly analogous to an object-like schema that describes the meta-data extracted from the underlying crawled or searched data.

The data model 170 not only serves as a basis for formulating queries and performing searches, but the data model 170 also serves as a basis for returning search results 174. As can be seen in FIG. 4, the data model 170 models the social network 106 in a way that allows a unified approach for constructing queries, performing queries, and providing query results.

Figure 5:
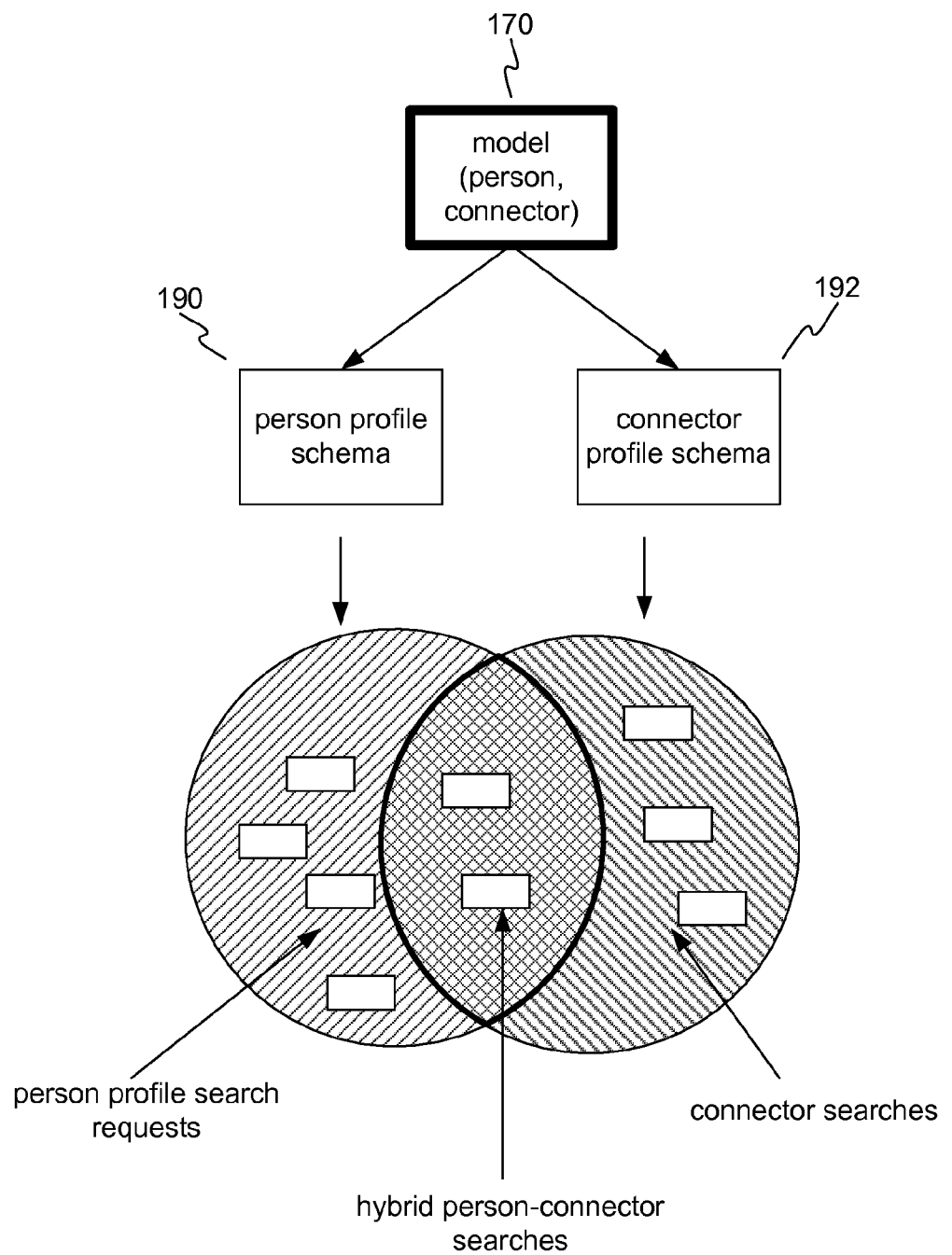
FIG. 5 shows how the data model can be defined with two schemas.

FIG. 5 shows how the data model 170 can be defined with two schemas. A person profile schema 190 defines properties of person nodes in the social network. A connector profile schema 192 defines properties of connectors that connect the searcher (a person in the social network) with other person nodes that match a search criteria. The two schemas can be used to define profile search requests, connector searches, or hybrid person-connector searches.

Figure 6:
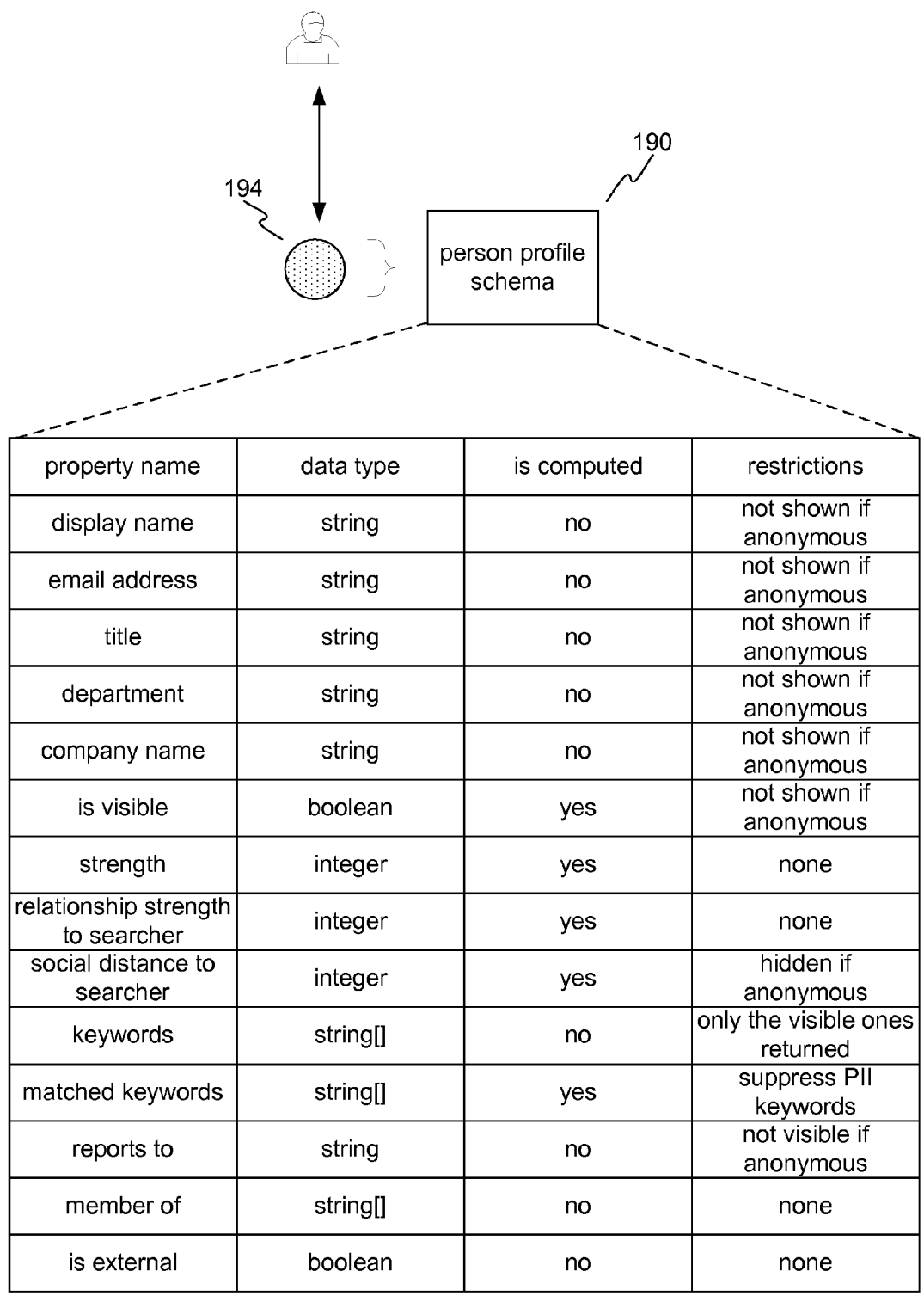
FIG. 6 shows the person profile schema.

FIG. 6 shows the person profile schema 190. The person profile schema 190 conceptually corresponds to a person or node 194, which is the type of data that is returned by a search. Before explaining the contents of the person profile schema 190, it should be noted that the person profile schema 190 has properties, each of which has a name, a data type, and is either computed or not. A property that is not computed is obtained from (or mapped to) a node of the social network 106. The values of computed properties can depend on various factors such as how a person in the social network is connected to other people in the social network, how well a person matches a search criteria, etc. Different restrictions can also be associated with different properties.

Referring again to FIG. 6, the person profile schema defines some personal information such as a name that is displayed for the person's profile, an email address, title, or other personal information. In an organizational setting, organizational properties such department, company name, and "is internal" can be defined ("is internal" indicates whether the person is within a same organization or unit as another person, for instance, a person conducting a search).

The "keywords" property defines a list of words that make up the substantive information or content associated with a particular profile. The keywords can correspond to anything, for example, what the person knows, what products the person works on, what interests the person has, or others. The search engine 136 performs full text searching on this property. Typically, this property is mainly used for searching rather than retrieval unless a searcher is interested in looking up all the details on a particular person's profile. Although not shown in FIG. 6, each keyword can be discretely set as either anonymous or not. This allows control over whether to reveal a person's personal identity (e.g., name, or email address, etc.) to a searcher, based on which keywords match the searcher's query. In other words, a person's profile can indicate whether keywords are anonymous or not.

The "matched keywords" property is computed by the search engine 136 and is defined to include the keywords of a profile that matched a search criteria. Another computed property is the strength property, which represents the strength of a result match to the query search terms. For example, in a keyword expertise search, this might represent the aggregated strength of the search terms to the matching profile. This property can have any range of values, for example, 0 to 100. The "social distance" property captures the social distance in the social network between the searcher and the result hit, i.e., a matching profile or node. The "social distance" is the number of hops or transitions it takes, starting from the searcher's profile, to get to the matching profile hit in a result set. For example, a value of 1 would restrict the result set to the first degree contacts of the searcher. A value of 2 would restrict the search to persons indirectly connected to the searcher by only one other person. The "social distance" can also be hidden if a match is flagged as anonymous. The "relationship strength to searcher" is another computed property that represents how strongly the searcher is related to a matching profile.

Any variety of ancillary properties can also be defined. For example, in an organizational setting, it may be useful to define whether a person is a member of a group such as a mailing list, who a person reports to, the name of the person's company, and so on. Other personal information often associated with a person can also be included.

As can be seen from the discussion above, the person profile schema 190 models persons in a way that allows it to be used both to formulate searches as well as to return search results. The person profile schema defines properties that can either be searched on (where results are restricted according to values specified for various properties) or returned as results of a search. In one search, a search request might specify a social distance (e.g., 3 or less) and a keyword (e.g., "computer") and the person profiles matching these criteria would be returned. In another search, the search request might not specify a social distance criteria, in which case the person profiles having a keyword that matches "computer" would be returned, and the social distance would be filled as computed.

Figure 7:
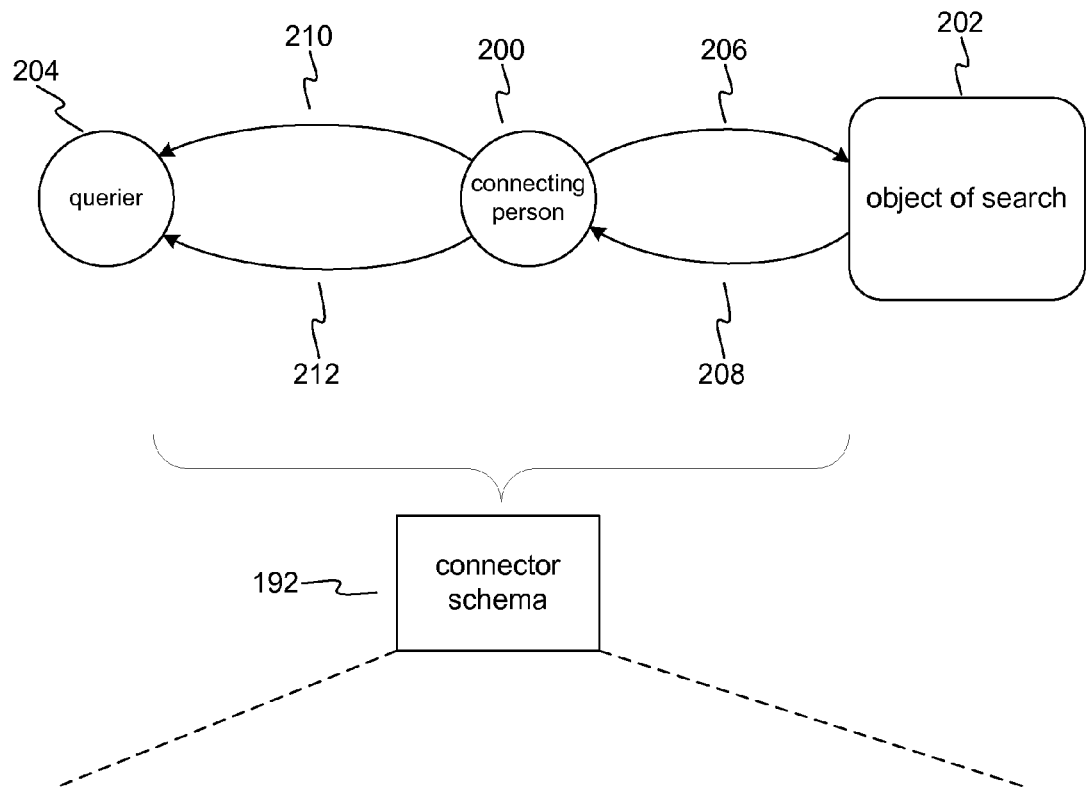
FIG. 7 shows the connector profile schema.

FIG. 7 shows the connector profile schema 192. The connector profile schema 192 defines properties of a connector (a person profile) that directly or indirectly connects two other person profiles. In other words, the connector profile schema 192 models how persons are connected, either as they are desired to be as specified in a search request, or as returned in a search result. This aspect of the data model 170 allows search requests to include information that specifies connectivity properties of person profiles that otherwise match a search request. The connector profile schema 192 can also be used to return connectivity information of matching person profiles. In the diagram at the top of FIG. 7, the connecting person 200 represents the person that connects a querier or searcher 202 (a person with a profile in the social network being searched) with a target or object of the search 204, which is also a person profile.

The first property of the connector profile schema 192 is the connecting person. The connecting person is the profile of the person that directly or indirectly connects the searcher 202 with an object of the search 204. The data type of the connecting person is a person profile as defined by the person profile schema 190 shown in FIG. 6. If the connecting person is flagged as anonymous, then the connecting person's profile is not displayed. The next property of the connector profile is the target or search object property, which is also a person profile data type.

The connector profile schema 192 also defines relational aspects of the connector. Some example relational properties are the "is visible" and the strength properties, although any types of relational properties can be used, as represented by the "other" properties shown in FIG. 7. The "is visible", strength, or other properties are represented by arrows 206, 208, 210, and 212, respectively. The strength property example represents the strength of a result match to the query search criteria. For example, it can represent the strength of the connector to the matching target(s). The "is visible" property represents the visibility of a result match based on the connector privacy settings of their social contacts (immediate neighbors in the social network). The visibility is computed from the perspective of the connector as, as will be discussed later. As mentioned, any type of property can be used. For example, a social distance property can be used to capture the social distance in the social network between the searcher and the result hit (matching profile). That is to say, it indicates how many hops it would take to traverse the social network from starting from the searcher profile to the profile hit in the result set. As another example, a matched targets property can be used to represent a list of targets who contributed to the qualification of the connector. For example, if a request specified a connector who knows people at company X, this property would contain the list of contacts who work for this company and who are in the social network of the connector.

It should be noted that the connector profile can be used as a basis for formulating searches for relationships. For example, a query that specifies that results should have a certain matching strength is in effect a search for particular relationships. A query specifying that the "is visible" property should be true in effect specifies relational properties of the matching persons. The connector schema 192 can be extended to include other relational properties to allow other types of relational searches to be constructed. Hereafter, connector searches should be understood to be searches for any types of relationships.

It should also be noted that the connector schema 192 can be extended to contain or reference any schema as the connector. In other words, the target type (person) need not be the only type of connector. For example, if an organization schema is the target and a person schema is the connector, a searcher could construct a query to search for persons that could help the searcher connect to organizations specified in the query.

Given the person profile schema 190 and the connector schema 192, it is possible to construct queries for persons or connectors. Furthermore, because the connector profile references person profiles, it is possible to construct multiply nested or hybrid person-connector searches. Consider some of the following examples.

Some queries may request only persons with certain profile properties. A query to find the list of people who know have the keywords 'knowledge' and 'Interchange' anywhere in their profiles would return their names, titles, departments, and email addresses along with the matched keywords. Such a query might look like: "RequestType: PeopleProfiles; Properties: {DisplayName, Title, Department, EmailAddress, MatchedKeywords}; SearchKeywords: 'Knowledge Interchange'". A query of the same nature, but requesting that the results be sorted by the strength of their relevance to the search criteria would look like: "RequestType: PeopleProfiles; Properties: {DisplayName, MatchedKeywords}; SearchKeywords: 'Knowledge Interchange'; SortProperties: Strength". A similar query, but specifying that only public results are to be returned could resemble: "RequestType: PeopleProfiles; Properties: {DisplayName, MatchedKeywords}; SearchKeywords: 'Knowledge Interchange' AND IsVisible:TRUE". A query to find the list of people who know about the phrase "Longhorn UI", are project managers (PMs), and work in the Office department, and the name of their immediate manager, might have information such as: "RequestType: PeopleProfiles; Properties: {DisplayName, ReportsTo}; SearchKeywords: 'longhorn UI' AND Title: 'PM' AND Department:'Office'".

Some other queries might request only connectors with certain properties. For example, a query to find the list of people who know "Bobby Kishore", display their names and their social distance from the searcher, and sort the list by social distance from the searcher, might include information such as: "RequestType: PeopleConnections; Properties: {Connector.DisplayName, SocialDistanceToMe}; SearchKeywords: Target.DisplayName:'Bobby Kishore'; SortProperties: SocialDistanceToMe". Another query might specify the same information and might also specify that only those who are in the searcher's first degree contacts and are public (not anonymous) should be returned. That is, a search to find people who can introduce the searcher to target contact 'Bobby Kishore' and sort by the strength of their relationship to 'Bobby Kishore', might look like: "RequestType: PeopleConnections; Properties: {Connector.DisplayName}; SearchKeywords: Target.DisplayName: 'Bobby Kishore' AND SocialDistanceToMe:1 AND IsVisible:TRUE; SortProperties: Strength". A search to find the list of people who know someone at Intel corporation, display their names and their social distance from the searcher, would appear, in perhaps different form, something like: "RequestType: PeopleConnections; Properties: {Connector.DisplayName, SocialDistanceToMe}; SearchKeywords: Target.CompanyName: 'Intel' AND Target.IsExternal:TRUE". The same query, but requesting only those who are first degree contacts of the searcher, might look like: "RequestType: PeopleConnections; Properties: {Connector.DisplayName, SocialDistanceToMe}; SearchKeywords: Target.CompanyName:'Intel' AND SocialDistanceToMe:1 AND Target.IsExternal:TRUE". A query to find the lost of people in the searcher's 1st degree network (immediate contacts in the social network) who know test engineers (SDETs) in the "Windows" department might look something like: "RequestType: PeopleConnections; Properties: {Connector.DisplayName}; SearchKeywords: Target.Title:'SDETs' AND Target.Department:'Windows' AND SocialDistanceToMe:1 ".

As mentioned, hybrid queries can be described using a mix of person profiles and connector profiles. Consider a query to find the list of people who know someone at Intel corporation and who know something about 'IA64' bit architecture. In one embodiment, such a request might appear as: "RequestType: PeopleConnections; Properties: {Connector.DisplayName}; SearchKeywords: Target.CompanyName:Intel AND Target.IsExternal:TRUE AND Connector.Keywords: IA64". A query to find the list of people who know people in Bobby Kishore's organization that know something about smart phones and also their names and their social distance from the searcher, sorted by social distance from the searcher, could resemble: "RequestType: PeopleConnections; Properties: {Connector.DisplayName, SocialDistanceToMe}; SearchKeywords: Target.ReportsTo:Bobby Kishore AND Target.Keywords:Smart Phones; "SortProperties: Social DistanceToMe".

The data model can also be used to formulate hierarchical searches based on organizational information. In one example, a searcher may desire to find the list of people that the searcher knows on the team reporting to 'Bobby Kishore', i.e., the searcher's first degree contacts who are in Bobby Kishore's organization. This request might be: "RequestType: PeopleProfiles; Properties: {DisplayName}; SearchKeywords: ReportsTo:Bobby Kishore AND SocialDistanceToMe:I". To find the list of people on the team reporting to 'Bobby Kishore' who know something about 'smart phones' and order them by their social distance from the searcher: "RequestType: PeopleProfiles; Properties: {DisplayName}; SearchKeywords: ReportsTo:Bobby Kishore AND Keywords:Smart Phones; SortProperties: SocialDistanceToMe".

It should be noted that the exact syntax of the query language used to formulate queries in accordance with the data model 170 can vary. For example, the query language can have a SQL-style syntax, with constructs included to specify connectivity information. The query language can also be expressed as a declarative language using a markup language such as XML. FIG. 8 shows some example query requests 230 and 232 in such an embodiment. Request 230 specifies people who have keywords 'knowledge interchange' in their profile, with the returned results to include their names, titles, dept's, email addresses. Request 232 is a relationship query example that specifies people who know Bobby Kishore and their names and email addresses sorted by strength.

Figure 9:
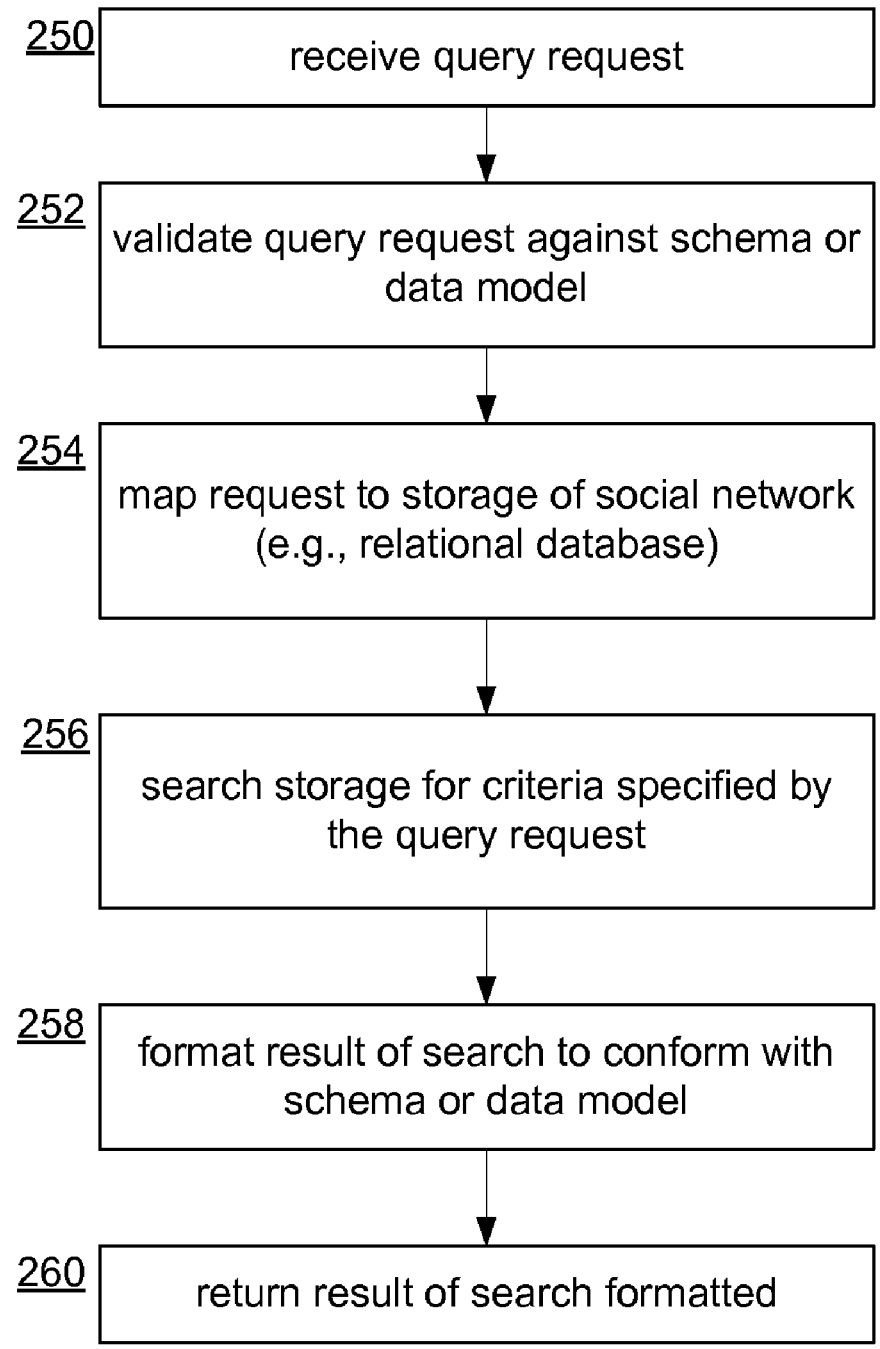
FIG. 9 shows a process performed by the search engine.

FIG. 9 shows a process performed by the search engine 136. The search engine 136 receives 250 a request in some form as discussed above. The request is validated 252 against the appropriate schemas (e.g., schemas 190 and/or 192). The request is mapped 254 to the storage schema of the social network to which the request is directed. The database or storage storing the social network is then searched 256 for records or nodes that satisfy the criteria specified by the request. The result of the search may be formatted 258 in accordance with the schemas that define the data model, and the results are returned 260 to the requester.

Figure 10:
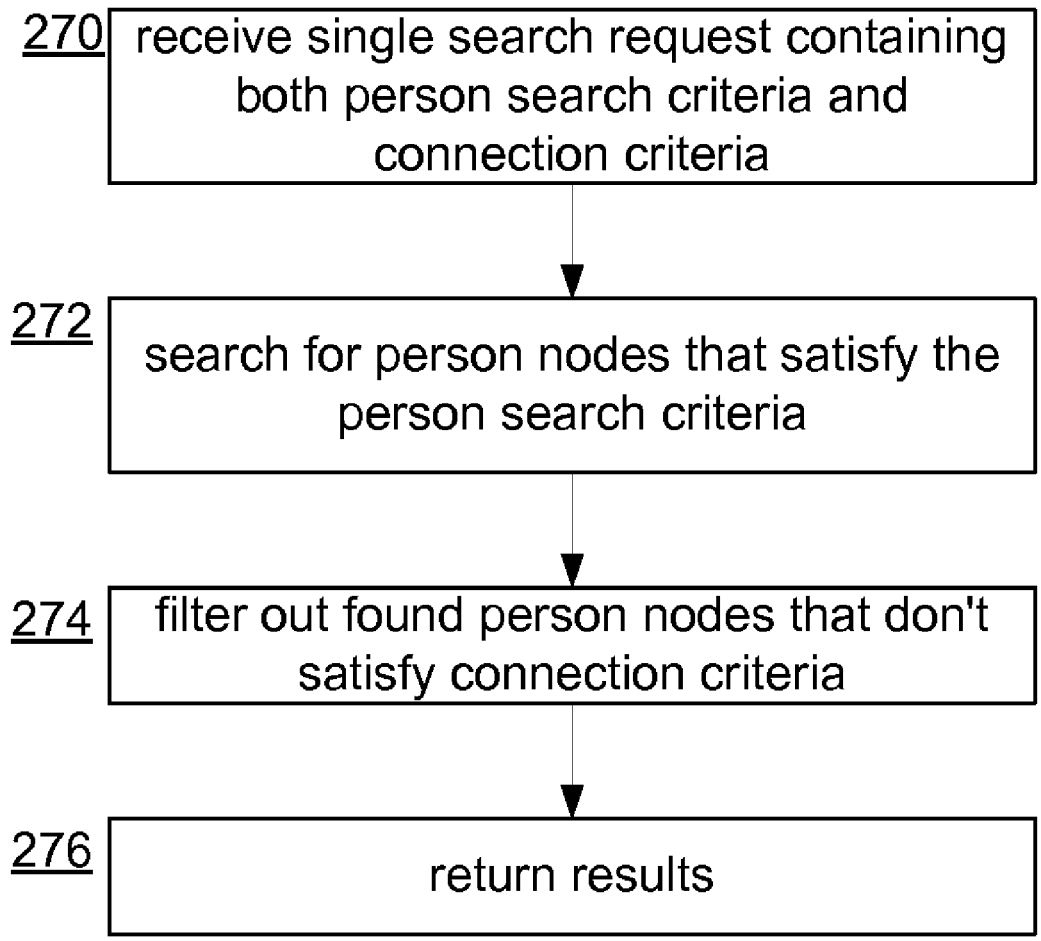
FIG. 10 shows one way that the search engine can perform a hybrid search.

FIG. 10 shows one way that the search engine 136 can perform a hybrid search. A single search request is received 270 containing both person and connector search criteria. The social network 272 is searched for person nodes that satisfy the person search criteria. Then found person profiles that don't satisfy the connectivity criteria are filtered 274 out. The results are then returned 276. It should be noted that it is not important which particular algorithm is used to perform searches specified by the schemas 190 and 192. The schemas 190 and 192 and the accompanying query language present declarative abstraction tools to enable developers and query users to specify query results without having to concern themselves with how the result is actually computed and fetched.

In conclusion, those skilled in the art will realize that storage devices used to store program instructions can be distributed across a network. For example a remote computer may store an example of a process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art, all or a portion of the software instructions may be carried out by a dedicated circuit, such as a DSP, programmable logic array, or the like.

All of the embodiments and features discussed above can be realized in the form of information stored in volatile or non-volatile computer or device readable medium. This is deemed to include at least media such as CD-ROM, magnetic media, flash ROM, etc., storing machine executable instructions, or source code, or any other information that can be used to enable or configure computing devices to perform the various embodiments discussed above. This is also deemed to include at least volatile memory such as RAM storing information such as CPU instructions during execution of a program carrying out an embodiment.

The invention claimed is:

1. One or more volatile or nonvolatile computer readable media storing information for enabling a computing device to perform a process for using a schema defining a data model of arbitrary social networks, where a social network comprises persons and relations between the persons, storing a schema, the schema modeling the social network and comprising:

a schema definition of person nodes, the definition of person nodes defining a person node as a data type comprising information identifying a person represented by the person node, properties of the person, and keywords corresponding to that person, the properties including stored properties that are independent of other person nodes and also computed properties that comprise properties of the person node that are computed from and depend on values of properties of other person nodes connected with the person node; and a schema definition of connectors, the definition of connectors defining a connector data type as including information identifying a first person node and a second person node and representing connectivity information about how the connector is related to the first person node or the second person node, the schema definition defining the first person node and the second person node as person node data types, the connectivity information comprising information allowing a connector to be any of a plurality of arbitrary types of connections; and searching a representation of a social network stored in a database in a form that does not conform with the schema, where the searching is performed by:

receiving query requests comprised of strings of a social-network query language that maps to the schema, where the query requests specify queries of the representation of the social network as modeled by the schema;

translating the query requests of the social-network query language to query requests in a query language implemented by the database;

searching the database by submitting the translated query requests to the database to be executed by the database;

receiving from the database results that satisfy the translated query requests, the results in a form provided by the database that does not conform to the schema; and translating the results of the searching the database from the form provided by the database to a form that conforms to the schema.

2. One or more volatile or non-volatile device readable media according to claim 1, wherein the connectivity information comprises indication whether there is or is not a knows-relationship with the first person node or the second person node such that two person nodes can be connected when the corresponding persons do not know each other.

3. One or more volatile or non-volatile device readable media according to claim 1, wherein the keywords of a person node describe knowledge of a person represented by the person node.

4. One or more volatile or non-volatile device readable media according to claim 1, wherein the definition of the person nodes further defines a person node as having anonymity information indicating whether personally identifiable information of the node should be revealed.

5. One or more volatile or non-volatile device readable media according to claim 4, wherein the definition of the person nodes further defines a person node's anonymity information as indicating whether a node is anonymous or not with respect to various of the person node's keywords.

6. One or more volatile or non-volatile device readable media according to claim 1, wherein the person node definition further defines person nodes as having a relationship strength to a person requesting a search.

7. One or more computer readable media storing information to enable a computing device to process a search request specifying a search of a representation of a social network, the representation of the social network comprising nodes representing persons in the social network and comprising connections between the nodes that represent social connections between the persons, the process comprising:

receiving the search request, the search request comprising a string in a query language other than a query language implemented by a database that stores the representation of the social network, the query language having structure that corresponds to a schema, the schema including a person schema modeling person nodes and properties thereof and including a connector schema modeling connector nodes and properties thereof including one or more properties that comprise instances of the person nodes modeled by the schema, the person and the connector schema defining one or more fields as computed fields that do not have a corresponding field stored in the database, the search request comprising:

person information indicating properties of persons to be searched for; and connection information indicating properties of persons who directly or indirectly connect, within the social network, a person making the search request to the persons specified by the properties of the persons to be searched for, the search request thereby specifying that the search only be satisfied by nodes that both (1) satisfy the person information and (2) are connected to the person making the request by nodes that satisfy the connection information, where specified connecting nodes do not themselves satisfy the search request; and searching the representation of a social network which is stored in a database, where the searching is performed by a search engine in communication with the database, the searching comprising:

receiving the query request, validating the query request against the schema, and using the schema to translate the query request into a query request in a query language implemented by the database, wherein both the indicated properties of the persons to be searched for and the specified properties of the persons who directly or indirectly or connect are mapped using the person schema defined in the schema; and receiving results satisfying the translated query from the database, and using the schema to translate the results of the searching the database to results structured to conform to the schema.

8. One or more computer readable media storing a search request according to claim 7, where the person information comprises a privacy indicator, and where a property of the connection information comprises information indicating whether a result match is to be provided to the searcher based on privacy settings of a result match.

9. One or more computer readable media storing a search request according to claim 7, where the connection information specifies a distance through the social network from a person making the request to a person matching the person information specified by the request.

10. One or more computer readable media storing a search request according to claim 7, where the connection information specifies a strength of a relationship in the social network between a person connecting the searcher to a person matching the person information.

11. One or more computer readable media storing a search request according to claim 7, where the connection information specifies a list of persons who contributed to connecting, in the social network, the searcher with a person matching the person information in the request.

12. One or more computer readable media storing a search request according to claim 7, where the person information specifies a social distance, within the social network, between the searcher and a person that otherwise matches the search request.

13. One or more computer readable media storing a search request according to claim 7, wherein the request is formatted according to schema information that defines a query language.

14. One or more computer readable media storing a search request according to claim 13, wherein the schema information comprises a person profile and a connector profile, the person information is formatted according to the person profile, and the connector information is formatted according to the connector profile.

15. One or more computer readable media storing a search request according to claim 14, further storing, either during or after storing the request, a response containing a search result corresponding to the request, where the search result is formatted according to the schema information.

16. One or more computer readable media storing information to allow a computer to send or receive queries for searching a social network or responses to such queries, where the computer performs a process comprising:

sending or receiving query statements of a query language not implemented by an underlying database that stores the social network, the database storing the social network according to a database schema, where the query language allows a query statement to specify target persons in the social network based on first properties of the target persons and allows the query statement to specify one or more second properties of persons that directly or indirectly connect, within the social network, the searcher to the target persons, where execution of the query statement will return only target persons that have the first properties and that are connected to the searcher by other persons that have the second properties, where persons that satisfy the second properties but not the first properties are not returned if the query statement is executed against the social network; and performing searches for the query statements by receiving the query statements, using the social network schema to map the query statements to a queries in a query language implemented by the database, submitting the queries to the database and in response receiving results structured in accordance with the database schema, where the social network schema defines a person node data type and a connector data type, the connector data type comprising properties including a connector property typed as the person node data type, where the specified first properties and second properties are mapped according to the person node data type.

17. One or more computer readable media storing information according to claim 16, where a property of a person that connects the searcher to the target persons comprises either a social distance in the social network from the searcher to the connecting person, or a strength of matching the target persons, or a visibility of a target person to the connecting person.

18. One or more computer readable media storing information according to claim 16, wherein the process further comprises sending or receiving responses to the query statements, where the responses conform to the query language.

19. One or more computer readable media storing information according to claim 16, wherein the query statements are instances of schema information that defines the query language.

20. One or more computer readable media storing information according to claim 16, wherein the query statements comprise keywords that specify the target persons.

* * * * *